United States Patent
Yazaki et al.

(10) Patent No.: US 7,943,013 B2
(45) Date of Patent: *May 17, 2011

(54) SHOE PRESS BELT FOR PAPER MAKING

(75) Inventors: Takao Yazaki, Tokyo (JP); Nobuharu Suzuki, Tokyo (JP); Shintaro Yamazaki, Tokyo (JP); Atsushi Ishino, Tokyo (JP)

(73) Assignee: Ichikawa Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/666,301

(22) PCT Filed: Jun. 20, 2008

(86) PCT No.: PCT/JP2008/061312
§ 371 (c)(1),
(2), (4) Date: Apr. 7, 2010

(87) PCT Pub. No.: WO2009/001766
PCT Pub. Date: Dec. 31, 2008

(65) Prior Publication Data
US 2010/0186920 A1     Jul. 29, 2010

(30) Foreign Application Priority Data
Jun. 25, 2007 (JP) .................................. 2007-16637

(51) Int. Cl.
*D21F 3/00* (2006.01)
(52) U.S. Cl. .................. 162/358.2; 162/358.1
(58) Field of Classification Search ............... 162/358.1, 162/358.2
See application file for complete search history.

(56) References Cited

U.S. PATENT DOCUMENTS

| | | |
|---|---|---|
| 2004/0029474 A1 | 2/2004 | Watanabe et al. |
| 2005/0287373 A1 | 12/2005 | Ishino et al. |
| 2006/0118261 A1 | 6/2006 | Ishino et al. |
| 2010/0314067 A1 | 12/2010 | Yazaki et al. |

FOREIGN PATENT DOCUMENTS
EP     0 617 066 A2     9/1994
(Continued)

OTHER PUBLICATIONS

U.S. Appl. No. 12/600,487, filed Dec. 30, 2009, Yazaki, et al.

(Continued)

*Primary Examiner* — Thao T. Tran
(74) *Attorney, Agent, or Firm* — Oblon, Spivak, McClelland, Maier & Neustadt, L.L.P.

(57) ABSTRACT

Disclosed is a shoe press belt (10) which comprises a reinforcing fibrous base material (6) embedded in a polyurethane layer, and has an outer circumference layer (2a, 21) and an inner circumference layer (2b, 22) each formed with a polyurethane. The polyurethane layer comprises a polyurethane which is produced by curing a composition comprising a mixture of an urethane prepolymer (A) and a curing agent (B). The urethane prepolymer (A) is produced by reacting an isocyanate compound (a) containing 55 to 100 mol % of a p-phenylene-diisocyanate compound with polytetramethylene glycol (b) and has an isocyanate group at its terminal. The curing agent (B) is selected from the group consisting of 1,4-butanediol, hydroquinone bis-βhydroxylethyl ether, 3,5-diethyltoluenediamine and 3,5-dimethylthiotoluenediamine. The belt (10) has excellent cracking resistance, bending fatigue resistance and wear resistance.

5 Claims, 8 Drawing Sheets

FOREIGN PATENT DOCUMENTS

| | | |
|---|---|---|
| JP | 2002 146694 | 5/2002 |
| JP | 2005 120571 | 5/2005 |
| JP | 2005 307421 | 11/2005 |
| JP | 2006 37328 | 2/2006 |
| JP | 2006 144139 | 6/2006 |
| JP | 2007 119979 | 5/2007 |
| WO | WO 2005/090429 A1 | 9/2005 |

OTHER PUBLICATIONS

U.S. Appl. No. 12/718,218, filed Mar. 5, 2010, Yazaki, et al.
Search Report issued on Jan. 11, 2011, in corresponding European patent Application No. 08777456.8 (6 pages).

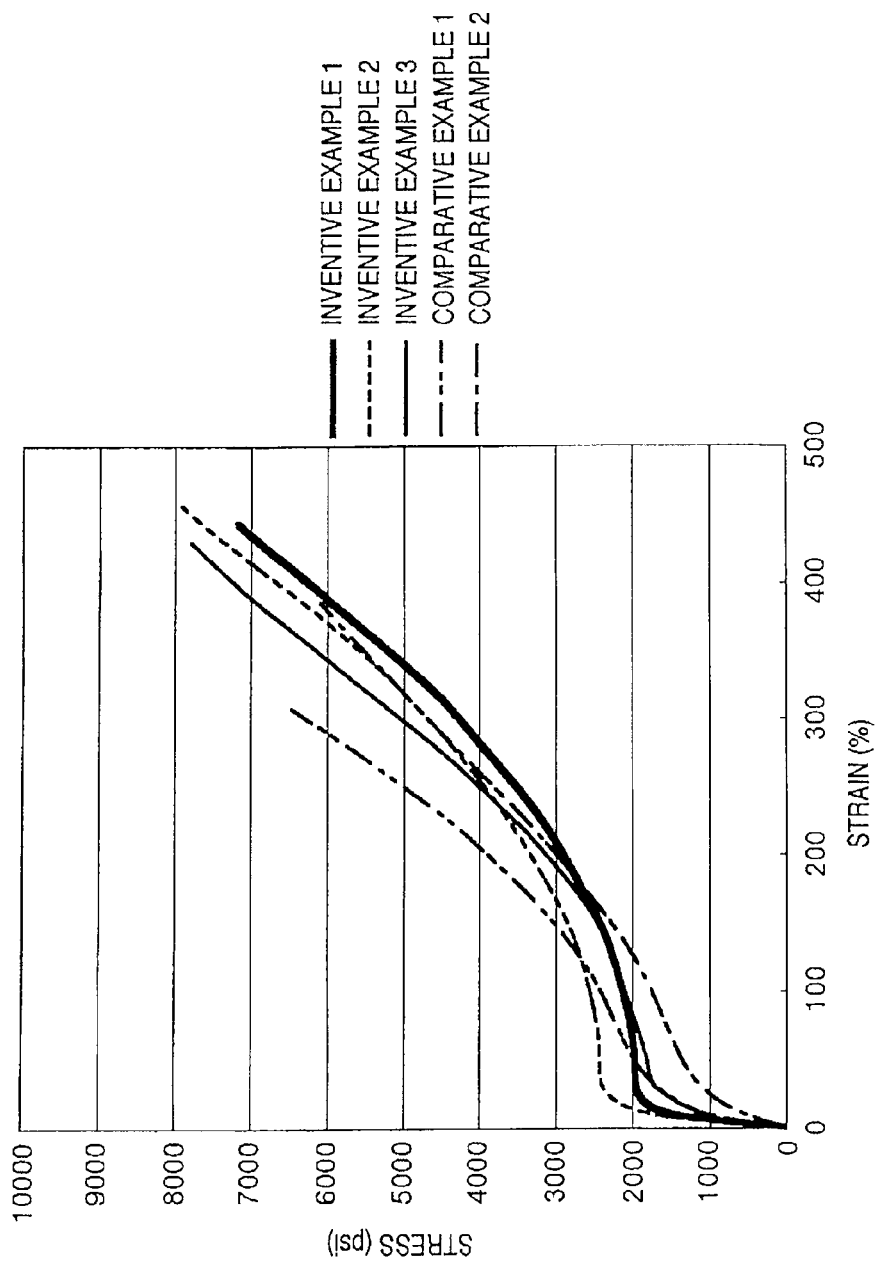

FIG.8

|  | REFERENCE EXAMPLE 1 | REFERENCE EXAMPLE 2 | REFERENCE EXAMPLE 3 | REFERENCE EXAMPLE 4 | REFERENCE EXAMPLE 5 | REFERENCE EXAMPLE 6 |
|---|---|---|---|---|---|---|
| URETHANE PREPOLYMER | INVENTIVE EXAMPLE 1 | INVENTIVE EXAMPLE 2 | INVENTIVE EXAMPLE 3 | COMPARATIVE EXAMPLE 1 |  | COMPARATIVE EXAMPLE 2 |
| ISOCYANATE | PPDI | PPDI | PPDI | TDI | TDI | MDI |
| POLYOL | PTMG | PTMG | PTMG | PTMG | PTMG | PTMG |
| NCO (%) | 5.51 | 5.51 | 5.51 | 6.02 | 6.02 | 4.85 |
| VISCOSITY (cps) | 1800 (@55°C) | 1800 (@55°C) | 1800 (@55°C) | 400 (@80°C) | 400 (@80°C) | 1000 (@70°C) |
| PREHEATING TEMPERATURE (°C) | 66 | 120 | 66 | 66 | 66 | 66 |
| CURING AGENT (COMPOUND NAME) | 1,4-BD | HQEE | ETHACURE 300 | ETHACURE 300 | MOCA | ETHACURE 300 |
| EQUIVALENT RATIO | 45.06 | 99.11 | 107.15 | 107.15 | 133.6 | 107.15 |
| PREHEATING TEMPERATURE (°C) | 24 | 130 | 24 | 24 | 116 | 24 |
| COMPOSITION (H/NCO RATIO) | 0.95 | 0.95 | 0.95 | 0.95 | 0.95 | 1.00 |
| CURING AGENT COMPOUNDED AMOUNT (PARTS) | 5.6 | 12.3 | 13.3 | 14.6 | 18.2 | 12.4 |
| PRECURING CONDITIONS (°C/Hr) | 127/0.5 | 127/0.5 | 127/0.5 | 100/0.5 | 100/0.5 | 100/1 |
| POST-CURING CONDITIONS (°C/Hr) | 127/16 | 127/16 | 127/16 | 100/16 | 100/16 | 100/14 |
| POLYURETHANE PROPERTIES — JIS A HARDNESS | 98.1 | 98.1 | 95.4 | 95.1 | 95.3 | 93.4 |
| 100% MODULUS (psi) | 2120 | 2570 | 2085 | 2430 | 1890 | 1760 |
| 300% MODULUS (psi) | 4300 | 4700 | 5065 | 6330 | 5020 | 4670 |
| BREAKING STRENGTH (psi) | 7200 | 7940 | 7820 | 6505 | 7540 | 6120 |
| BREAKING ELONGATION (%) | 440 | 450 | 430 | 305 | 360 | 385 |
| TEAR RESISTANCE (pli) | 370 | 380 | 335 | 260 | 220 | 190 |
| DEPTH OF WEAR (mm) | 0.101 | 0.257 | 0.263 | 0.140 | 0.135 | 0.316 |
| DE MATTIA ($\mu$m/COUNT) | 0.55 | 0.58 | 0.49 | 6.09 | 8.10 | 1.41 |

FIG.9

| TIME | STROKE COUNT | INVENTIVE EXAMPLE 1 | INVENTIVE EXAMPLE 2 | INVENTIVE EXAMPLE 3 | COMPARATIVE EXAMPLE 1 | COMPARATIVE EXAMPLE 2 |
|---|---|---|---|---|---|---|
| 0.0 | 0 | 2.12 | 2.11 | 2.07 | 2.08 | 2.14 |
| 0.5 | 180 | 3.39 | 3.16 | 2.60 | 3.81 | 3.32 |
| 1.5 | 539 | 3.97 | 3.64 | 2.95 | 5.79 | 4.43 |
| 3.0 | 1077 | 4.51 | 4.05 | 3.38 | 8.71 | 5.45 |
| 5.0 | 1795 | | | | 12.9 | 6.30 |
| 6.0 | 2154 | 5.15 | 4.72 | 4.00 | | |
| 7.0 | 2513 | | | | 19.28 | |
| 10.0 | 3590 | | 5.54 | | | 8.28 |
| 11.0 | 3949 | 6.10 | | | | |
| 15.0 | 5385 | | 6.42 | | | |
| 16.0 | 5744 | | | 5.79 | | 10.49 |
| 20.0 | 7180 | | | | | 12.33 |
| 22.0 | 7898 | 7.77 | | | | |
| 25.0 | 8975 | | 7.93 | | | |
| 27.0 | 9693 | 8.53 | | | | 16.59 |
| 31.0 | 11129 | | | 8.09 | | |
| 32.0 | 11488 | 9.23 | | | | |
| 35.0 | 12565 | | 9.74 | | | |
| 37.0 | 13283 | 10.01 | | | | |
| 40.0 | 14360 | | | 9.43 | | |
| 45.0 | 16155 | | 11.55 | | | |
| 51.0 | 18309 | 12.22 | | | | |
| 53.0 | 19027 | | | 11.40 | | 3.83 |
| 55.0 | 19745 | | 13.76 | | | |
| 62.0 | 22258 | 14.12 | | | | |
| 63.0 | 22617 | | | 13.09 | | |
| 65.0 | 23335 | | 16.25 | | | |
| 69.5 | 24951 | 17.65 | | | | |
| 73.5 | 26387 | | | 15.18 | | |
| STROKE COUNT AT 15mm | | 23612 | 22302 | 26202 | 2123 | 9089 |

FIG.10

| | INVENTIVE EXAMPLE 1 | INVENTIVE EXAMPLE 2 | INVENTIVE EXAMPLE 3 | COMPARATIVE EXAMPLE 1 | COMPARATIVE EXAMPLE 2 |
|---|---|---|---|---|---|
| DEPTH OF WEAR (mm) | 0.213 | 0.471 | 0.501 | 0.269 | 0.615 |
| FLEXING COUNT (TEN THOUSANDS) | 70 (NOT BROKEN) | 70 (NOT BROKEN) | 70 (NOT BROKEN) | 20 | 50 |

SHOE PRESS BELT FOR PAPER MAKING

FIELD OF THE INVENTION

The present invention relates to a shoe press belt for papermaking for use in a papermaking shoe press apparatus, and more particularly to a shoe press belt for use in a closed-type shoe press.

More specifically, the present invention is concerned with a shoe press belt for papermaking which has a resin layer of polyurethane having a certain composition and hardness and which has excellent mechanical properties in crack resistance, flexural fatigue resistance, wear resistance, etc.

BACKGROUND OF THE ART

FIG. 4 is a cross-sectional view of the shoe press belt for papermaking, and FIG. 5 is a cross-sectional view of a shoe press apparatus for papermaking.

As shown in FIG. 5, a shoe press for papermaking comprises a shoe press mechanism including a looped shoe press belt 10 interposed between a press roll 1 and a shoe 5. In this mechanism, the press roll 1 and the shoe 5 provide a pressing region therebetween through which a feed felt 3 and a wet paper web 4 are caused to pass to dehydrate the wet paper web 4.

As shown in FIG. 4, the shoe press belt 10 comprises an outer circumferential polyurethane layer 21 and an inner circumferential polyurethane layer 22 which are disposed respectively on both surfaces of a reinforcing fiber base 6, which is sealed (embedded) in the polyurethane layers.

The outer circumferential polyurethane layer 21, which is held against the press roll, has a number of concave grooves 24 defined in its surface. Water, which is squeezed from the wet paper web 4 when it is pressed in the pressing region, is held in the concave grooves 24, and then brought out of the pressing region as the shoe press belt 10 rotates.

Ridges 25 formed on the outer circumferential polyurethane layer 21, which is held against the press roll, are required to have their mechanical properties improved. The mechanical properties include crack resistance, flexural fatigue resistance and wear resistance, etc. against vertical pressing forces applied by the press roll 1 and against wear and flexural fatigue of the shoe press belt in the pressing region.

For the above reasons, polyurethane having an excellent crack resistance is widely used as the resin material of the outer circumferential polyurethane layer 21 of the shoe press belt 10.

Shoe press belts, for example, comprise a reinforcing fiber base and a polyurethane layer, which are integrally combined with each other. The polyurethane layer comprises an outer circumferential layer and an inner circumferential layer. The reinforcing fiber base is embedded in the polyurethane layer.

JP, A, 2002-146694 and JP, A, 2005-120571 disclose shoe press belts made of polyurethane.

The outer circumferential layers of these shoe press belts are made of polyurethane having a "JIS A hardness" ranging from 89 to 94. The polyurethane comprises a mixture of a urethane prepolymer (HIPRENE L: trade name, manufactured by Mitsui Chemicals, Inc.) and a curing agent containing dimethylthiotoluenediamine. The equivalent ratio (H/NCO) of an active hydrogen group (H) of the curing agent and an isocyanate group (NCO) of the urethane prepolymer has a value in the range of $1<H/NCO<1.15$.

The mixed composition of the urethane prepolymer and the curing agent is cured into the polyurethane. The urethane prepolymer is produced by reacting tolylene diisocyanate (TDI) with polytetramethylene glycol (PTMG). The urethane prepolymer has a terminal isocyanate group.

The inner circumferential layers of the papermaking belts are made of polyurethane comprising a mixture of a urethane prepolymer (manufactured by Mitsui Chemicals, Inc.) and a mixed curing agent. The urethane prepolymer and the mixed curing agent are mixed such that the equivalent ratio (H/NCO) of an active hydrogen group (H) of the curing agent and an isocyanate group (NCO) of the urethane prepolymer has a value in the range of $0.85 \leq H/NCO < 1$.

The urethane prepolymer is produced by reacting 4,4'-methylene bis(phenyl isocyanate) (MDI) with polytetramethylene glycol (PTMG). The urethane prepolymer has a terminal isocyanate group. The mixed curing agent contains 65 parts of dimethylthiotoluenediamine and 35 parts of polytetramethylene glycol (PTMG).

The mixed composition of the urethane prepolymer and the curing agent is cured into the polyurethane. The shoe press belt is formed of these polyurethanes.

A papermaking shoe press belt also disclosed in JP, A, 2005-307421 comprises an integral structure of a reinforcing fiber base and a polyurethane layer. The polyurethane layer of the belt comprises an outer circumferential layer and an inner circumferential layer. The reinforcing fiber base is embedded in the polyurethane layer.

The polyurethane, of the outer circumferential layer and the inner circumferential layer of the belt, comprises a mixture of a urethane prepolymer (HIPRENE L: trade name, manufactured by Mitsui Chemicals, Inc.) and a curing agent containing dimethylthiotoluenediamine. The urethane prepolymer and the curing agent are mixed such that the equivalent ratio (H/NCO) of an active hydrogen group (H) of the curing agent and an isocyanate group (NCO) of the urethane prepolymer has a value of 0.97.

The urethane prepolymer is produced by reacting tolylene diisocyanate (TDI) with polytetramethylene glycol (PTMG), and has a terminal isocyanate group.

The mixed composition of the urethane prepolymer and the curing agent is cured into the polyurethane which has a "JIS A hardness" ranging from 94 to 95.

A shoe press belt disclosed in JP, A, 2006-144139 comprises an integral structure of a reinforcing fiber base and a polyurethane layer. The reinforcing fiber base is embedded in the polyurethane layer.

The polyurethane of the shoe press belt is made of a urethane prepolymer and a curing agent which are mixed such that the equivalent ratio (H/NCO) is in the range of $0.9 \leq H/NCO \leq 1.10$.

The urethane prepolymer contains unreactive polydimethylsiloxane in a liquid form. The urethane prepolymer is produced by reacting tolylene diisocyanate (TDI) with polytetramethylene glycol (PTMG), and has a terminal isocyanate group.

The curing agent is selected from a group consisting of dimethylthiotoluenediamine (trade name: ETHACURE300) and 4,4-methylene bis-(2-chloroaniline) {MOCA}.

The mixed composition of the urethane prepolymer and the curing agent is cured into the polyurethane which has a "JIS A hardness" ranging from 93 to 96.

JP, A, 2006-144139 also proposes another shoe press belt. The proposed shoe press belt is made of polyurethane which is a mixture of polyurethane, having a "JIS A hardness" ranging from 90 to 93 and containing unreactive polydimethylsiloxane in a liquid form, and polyurethane having a "JIS A hardness" of 98 and free of unreactive polydimethylsiloxane in a liquid form. The mixture is mixed with a curing agent of dimethylthiotoluenediamine at an equivalent ratio in the range of $0.9 \leq H/NCO \leq 1.10$.

The mixed composition of the urethane prepolymer and the curing agent is cured so that the shoe press belt which has a "JIS A hardness" ranging from 90 to 93 is formed.

Patent Document 1: JP, A, 2002-146694
Patent Document 2: JP, A, 2005-120571
Patent Document 3: JP, A, 2005-307421
Patent Document 4: JP, A, 2006-144139

The embodiments of JP, A, 2002-146694, JP, A, 2005-120571, JP, A, 2005-307421 and JP, A, 2006-144139 disclose shoe press belts.

The shoe press belts are measured by an inspecting apparatus. For measurement, the opposite ends of a test piece of the belt are gripped by clamp hands. The cramp hands are reciprocally movable horizontally in a ganged fashion. The test piece has an evaluation surface facing a rotating roll, and the press shoe moves toward the rotating roll to press the test piece for measuring crack resistance thereof.

While the test piece was subjected to a tensile force of 3 kg/cm and a pressure of 36 kg/cm$^2$ by the inspecting apparatus, the clamp hands were reciprocally moved at a speed of 40 cm/sec., and the number of times that the clamp hands were reciprocally moved was measured until the test piece was cracked. As a result, it was found that no crack developed in the test piece after the clamp hands were reciprocally moved 1,000,000 times.

In recent years, the shoe press belts have been used in highly severe environments as the operating speed has increased to meet demands for higher paper productivity growth, the shoe press belts have had an increased width of about 10 m, and the pressure applied in the pressing region has become higher. Therefore, the various properties of the shoe press belts need to be improved further.

The present invention has been made to solve the above problems. It is an object of the present invention to provide a shoe press belt for papermaking which has excellent mechanical properties in crack resistance, flexural fatigue resistance, wear resistance, etc.

DISCLOSURE OF THE INVENTION

To achieve the above object, a shoe press belt for papermaking according to the present invention comprises a reinforcing fiber base and a polyurethane layer which are integral with each other and the reinforcing fiber base being embedded in the polyurethane layer. The polyurethane layer includes a polyurethane produced by curing a mixed composition of a urethane prepolymer (A) and a curing agent (B).

The urethane prepolymer (A) is obtained by reacting an isocyanate compound (a) comprising 55 to 100 molar % of a p-phenylene-diisocyanate compound with polytetramethylene glycol (b), and has a terminal isocyanate group.

The curing agent (B) is selected from the group consisting of 1,4-butanediol, hydroquinone bis-βhydroxyl ethyl ether (HQEE), 3,5-diethyltoluenediamine and 3,5-dimethylthiotoluenediamine.

Preferably, the polyurethane is produced by curing the mixed composition in which the urethane prepolymer and the curing agent are mixed such that the equivalent ratio (H/NCO) of an active hydrogen group (H) of the curing agent and an isocyanate group (NCO) of the urethane prepolymer has a value in the range of $0.88<H/NCO \leq 1.0$. Preferably, the polyurethane has a "JIS A hardness" ranging from 92 to 99.

A shoe press belt for papermaking according to another aspect of the present invention comprises a reinforcing fiber base and a polyurethane layer which are integral with each other. The reinforcing fiber base is embedded in the polyurethane layer. An outer circumferential layer and an inner circumferential layer of the belt are made of polyurethane.

The polyurethane of the outer circumferential layer is produced by curing a mixed composition of
an urethane prepolymer (A), obtained by reacting p-phenylene-diisocyanate with polytetramethylene glycol (b) and having a terminal isocyanate group, and
a curing agent (B) selected from the group consisting of 1,4-butanediol, hydroquinone bis-βhydroxyl ethyl ether, 3,5-diethyltoluenediamine and 3,5-dimethylthiotoluenediamine.

The polyurethane of the inner circumferential layer is produced by curing a mixed composition of an urethane prepolymer (A) and a curing agent (B) selected from the group consisting of 3,5-dimethylthiotoluenediamine, hydroquinone bis-βhydroxyl ethyl ether, 3,5-diethyltoluenediamine and 1,4-butanediol.

The urethane prepolymer (A) is obtained by reacting an isocyanate compound (a) selected from the group consisting of 2,4-tolylene diisocyanate, 2,6-tolylene diisocyanate and 4,4'-methylene bis(phenyl isocyanate) with polytetramethylene glycol (b). The urethane prepolymer (A) has a terminal isocyanate group. The reinforcing fiber base is embedded in the inner circumferential layer.

Preferably, the polyurethane of the outer circumferential layer is produced by curing the mixed composition in which the urethane prepolymer and the curing agent are mixed such that the equivalent ratio (H/NCO) of an active hydrogen group (H) of the curing agent (B) and an isocyanate group (NCO) of the urethane prepolymer has a value in the range of $0.88<H/NCO \leq 1.0$.

The polyurethane of the inner circumferential layer is produced by curing the mixed composition in which the urethane prepolymer and the curing agent are mixed such that the equivalent ratio (H/NCO) of an active hydrogen group (H) of the curing agent (B) and an isocyanate group (NCO) of the urethane prepolymer has a value in the range of $0.93<H/NCO<1.05$. Preferably, the polyurethane of the outer circumferential layer has a "JIS A hardness" ranging from 92 to 99.

A shoe press belt for papermaking according to still another aspect of the present invention comprises a reinforcing fiber base and a polyurethane layer which are integral with each other. The reinforcing fiber base is embedded in an intermediate layer of the polyurethane layer. An outer circumferential polyurethane layer and an inner circumferential polyurethane layer are disposed on respective both sides of the intermediate polyurethane layer.

The outer circumferential polyurethane layer and the inner circumferential polyurethane layer are made of a polyurethane produced by curing a mixed composition of an urethane prepolymer (A) and a curing agent (B) selected from 1,4-butanediol, hydroquinone bis-βhydroxyl ethyl ether, 3,5-diethyltoluenediamine and 3,5-dimethylthiotoluenediamine. The urethane prepolymer (A) is obtained by reacting p-phenylene-diisocyanate with polytetramethylene glycol (b) and has a terminal isocyanate group.

The intermediate polyurethane layer is made of polyurethane produced by curing a mixed composition of an urethane prepolymer (A) and a curing agent (B) selected from the group consisting of 1,4-butanediol, hydroquinone bis-βhydroxyl ethyl ether, 3,5-dimethylthiotoluenediamine and 3,5-diethyltoluenediamine.

The urethane prepolymer (A) is obtained by reacting an isocyanate compound (a) selected from the group consisting of 2,4-tolylene diisocyanate, 2,6-tolylene diisocyanate and 4,4'-methylene bis(phenyl isocyanate) with polytetramethylene glycol (b). The urethane prepolymer (A) has a terminal isocyanate group.

Preferably, the polyurethane of the outer circumferential polyurethane layer and the inner circumferential polyurethane layer is produced by curing the mixed composition in which the urethane prepolymer and the curing agent are mixed such that the equivalent ratio (H/NCO) of an active hydrogen group (H) of the curing agent (B) and an isocyanate group (NCO) of the urethane prepolymer has a value in the range of $0.88 < H/NCO \leq 1.0$.

The polyurethane of the intermediate layer is produced by curing the mixed composition in which the urethane prepolymer and the curing agent are mixed such that the equivalent ratio (H/NCO) of an active hydrogen group (H) of the curing agent and an isocyanate group (NCO) of the urethane prepolymer has a value in the range of $0.93 < H/NCO < 1.05$.

Preferably, the polyurethane of the inner circumferential layer and the outer circumferential layer has a "JIS A hardness" ranging from 92 to 99.

As described above, the urethane prepolymer of the outer circumferential polyurethane layer of the shoe press belt which faces a wet paper web should preferably be made of materials including p-phenylene-diisocyanate, for easily forming linear polymers, and polytetramethylene glycol.

The curing agent should preferably comprise a compound selected from a group consisting of aliphatic 1,4-butanediol for easily forming linear polymers, hydroquinone bis-βhydroxyl ethyl ether, 3,5-diethyltoluenediamine and 3,5-dimethylthiotoluenediamine.

The polyurethane thus produced is excellent to provide a shoe press belt which has mechanical properties in crack resistance, flexural fatigue resistance, wear resistance, etc. The durability of the shoe press belt is expected to be at least 1.5 times the durability (usually 2 to 3 months) of shoe press belts currently in use.

The wear resistance of the belt increases, when hard polyurethane having a "JIS A hardness" ranging from 92 to 99 is used as the polyurethane of the outer circumferential layer and the inner circumferential layer. The durability of the shoe press belt further increases, when the intermediate layer is made of polyurethane having an excellent ductility for additional flexural resistance.

BRIEF DESCRIPTION OF THE DRAWINGS

FIG. 2 a graph showing stress vs. strain curves of various polyurethanes.

FIG. 8 a table showing experimental data.

FIG. 9 a table showing experimental data.

FIG. 10 a table showing experimental data.

BEST MODE FOR CARRYING OUT THE INVENTION

Embodiments of the present invention are described in detail below with reference to the drawings.

FIG. 1 is cross-sectional views of shoe press belts 10 for papermaking according to the present invention. Each of the belts 10 comprises an integral structure of a reinforcing fiber base 6 and a polyurethane layer. The reinforcing fiber base 6 is embedded (sealed) in the polyurethane layer.

The polyurethane layer includes a polyurethane produced by curing a mixed composition of a urethane prepolymer (A) and a curing agent (B). The urethane prepolymer (A) is obtained by reacting an isocyanate compound (a) comprising 55 to 100 molar % of a p-phenylene-diisocyanate compound with polytetramethylene glycol (b) and the urethane prepolymer (A) has a terminal isocyanate group.

The curing agent (B) is selected from 1,4-butanediol, hydroquinone bis-βhydroxyl ethyl ether, 3,5-diethyltoluenediamine and 3,5-dimethylthiotoluenediamine.

Figure 1A:
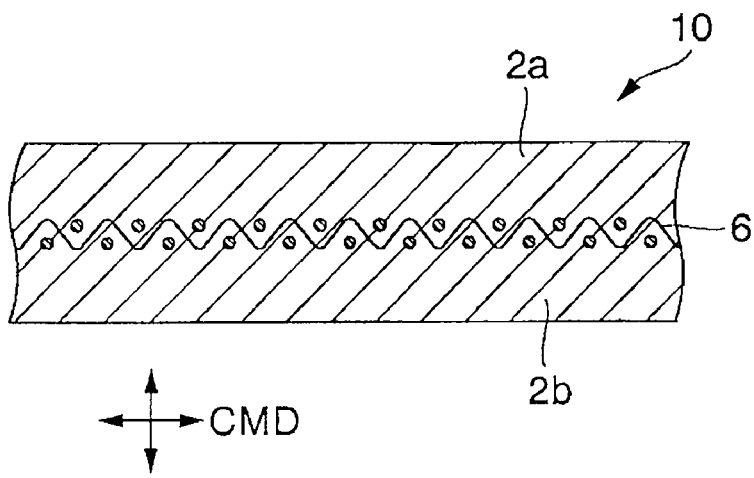
FIG. 1 cross-sectional views of shoe press belts for papermaking.

The shoe press belt 10 shown in FIG. 1(A) includes a polyurethane layer of single-layer structure. The shoe press belt 10 shown in FIG. 1(B) includes a polyurethane layer of two-layer structure comprising an outer circumferential layer 2a and an inner circumferential layer 2b. The shoe press belt 10 shown in FIG. 1(C) includes a polyurethane layer of three-layer structure comprising an outer circumferential layer 2a, an intermediate layer 2c and an inner circumferential layer 2b.

Either one of the shoe press belts 10 shown in FIGS. 1(A), (B), (C) has the outer circumferential polyurethane layer 2a for facing a wet paper web, which is made of the polyurethane described above (the polyurethane according to claim 1 of the present invention) produced when the mixed composition of the urethane prepolymer (A) and the curing agent (B) is cured.

Figure 3:
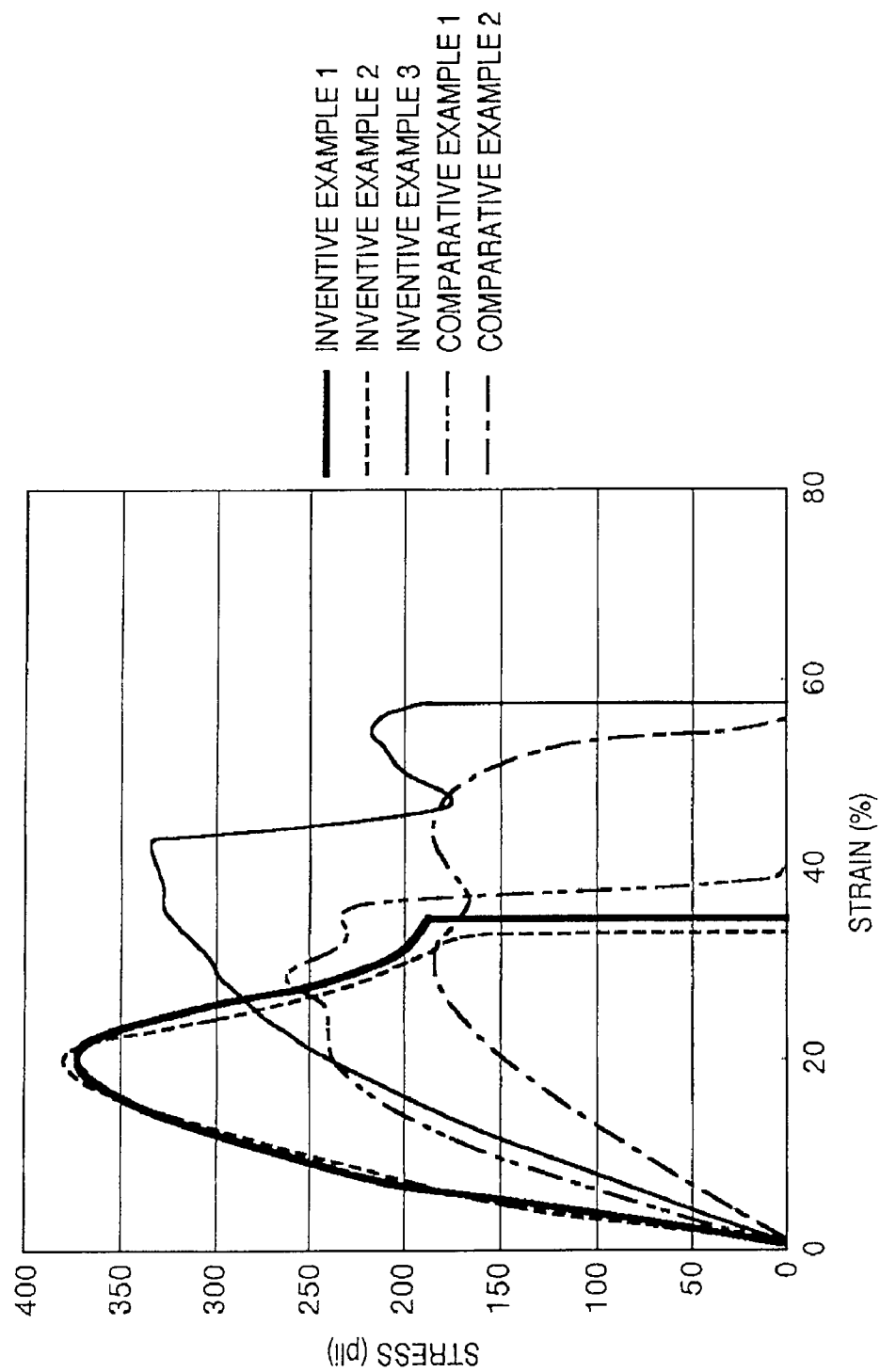
FIG. 3 a diagram showing a correlation between stresses and strains with respect to tear resistance for notched angles made of various polyurethanes.

FIG. 2 is a graph showing stress vs. strain curves of various polyurethanes (stress-strain curve). The vertical and horizontal axes of FIG. 2 represent stresses and strains, respectively. FIG. 3 is a diagram showing a correlation between stresses (vertical axis) and strains (horizontal axis) with respect to tear resistance for notched angles made of various polyurethanes.

Figure 4:
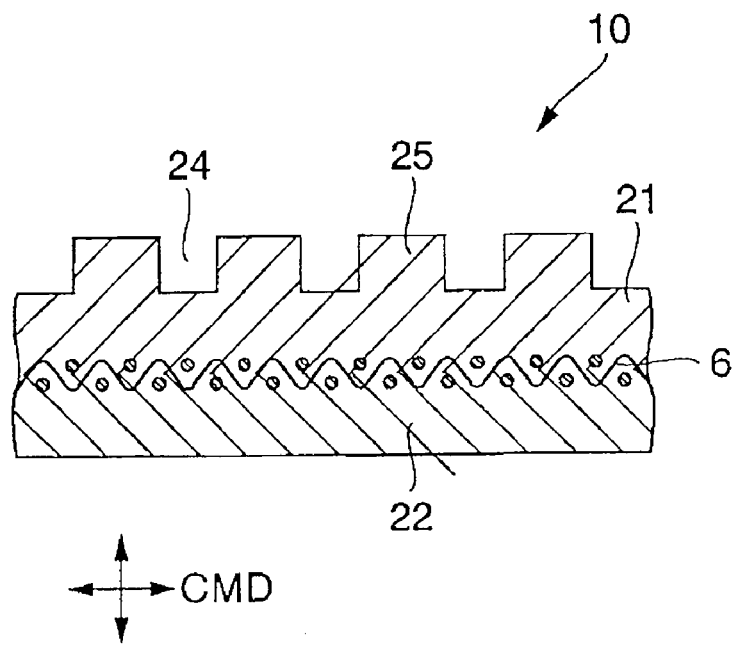
FIG. 4 a cross-sectional view of a shoe press belt for papermaking.

FIG. 4 is a cross-sectional view of a shoe press belt 10 with concave grooves 24 defined therein according to the present invention. There are various shoe press belts 10 with different shapes and depths of concave grooves 24 and different width ratios of concave grooves 24 and ridges 25.

Figure 5:
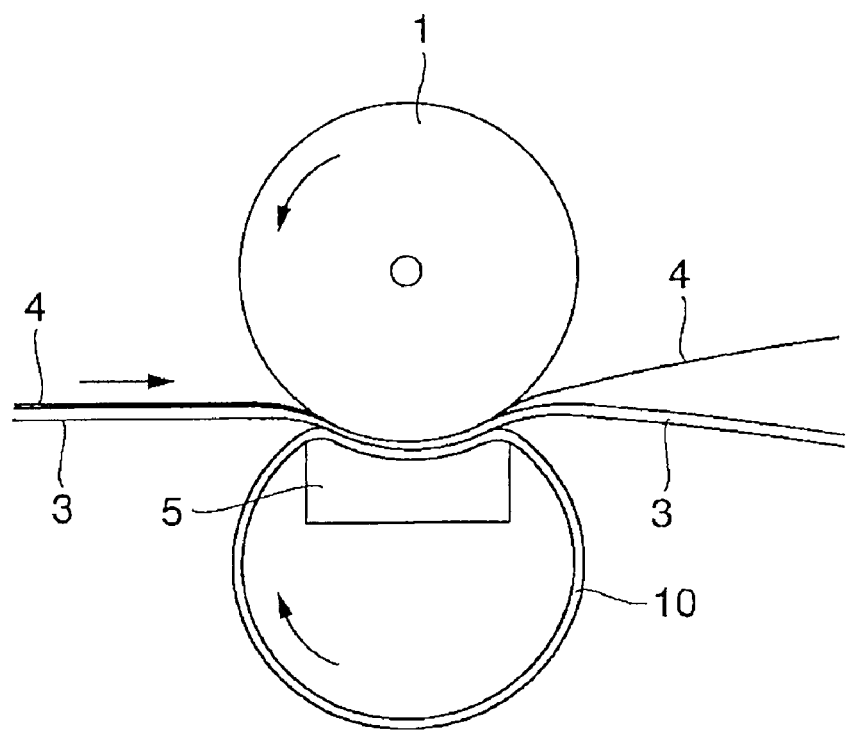
FIG. 5 a cross-sectional view of a wet paper web dehydrator.
Figure 6:
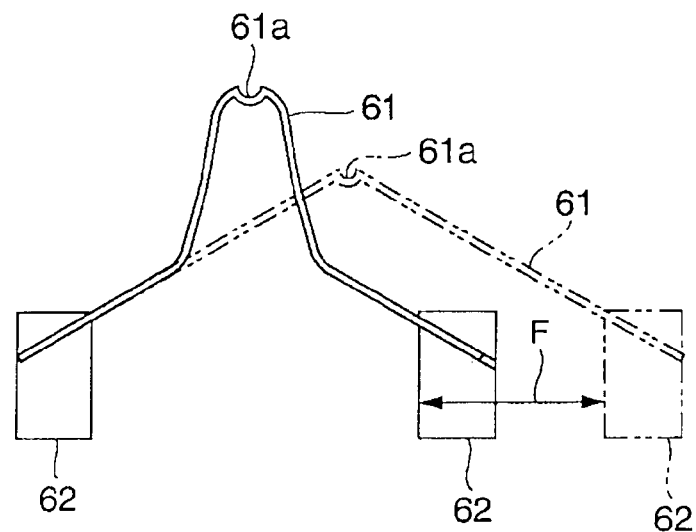
FIG. 6 a view illustrative of similar to a De Mattia flexing test.

FIG. 5 is a cross-sectional view of a wet paper web dehydrator. FIG. 6 is a view illustrative of a flexural test similar to the De Mattia flexing test defined according to JIS.

Using a tester shown in FIG. 6, test pieces were tested for crack development at a temperature of 20° C. and a relative humidity of 52% under the following conditions:

A test piece 61 had a size represented by a width of 25 mm and a length of 185 mm (including a gripping allowance (20 mm on each side)), and a pair of grippers 62 were spaced apart from each other by a distance of 150 mm and had a thickness of 3.4 mm. The test piece 61 had a semicircular dimple 61a defined centrally therein which had a radius of 1.5 mm.

One of the grippers 62 was reciprocally moved as indicated by the arrow F. In this reciprocating movement, the distance of the grippers 62 from each other was set at a maximum distance of 100 mm and a minimum distance of 35 mm, and the distance of reciprocating movement was set at 65 mm, and the reciprocating rate was set at 360 reciprocating strokes/minute.

A notch was defined centrally in the test piece 61 and had a length of about 2.1 mm in the transverse direction of the test piece 61. The test piece 61 was inclined at an angle of 45° to the direction in which the grippers 62 are relatively reciprocally moved as indicated by the arrow F.

Under the above conditions, the test piece 61 was repeatedly flexed and measured for the length of a crack each time a certain stroke count was reached. The test was finished at the time the crack length, starting from the initial measured notch length value (about 2.1 mm) exceeded 15 mm.

The reinforcing fiber base 6 may comprise a woven fabric disclosed in JP, A, 2002-146694, JP, A, 2005-120571, JP, A, 2005-307421 and JP, A, 2006-144139, or may be a reinforcing fiber base disclosed in other documents.

For example, the reinforcing fiber base 6 is made of warp and weft yarns comprising multifilament twisted yarns of 5,000 dtex made of polyethylene terephthalate (PET). The reinforcing fiber base 6 is in the form of a grid-like web wherein the warp yarns are sandwiched by the weft yarns and the crossings of the warp yarns and the weft yarns are joined by a polyurethane adhesive.

The reinforcing fiber base 6 may include aramid fibers or polyamide fibers such as Nylon 6,6, Nylon 6,10, Nylon 6, or the like, instead of the polyethylene terephthalate fibers. The warp yarns and the weft yarns may be made of fibers which are different from each other. The warp yarns and the weft yarns may have different thicknesses such that one of them has a thickness of 5,000 dtex and the other a thickness of 7,000 dtex.

The outer circumferential layers 2a, 21 of the shoe press belt 10 are made of a polyurethane. The polyurethane of the outer circumferential layers 2a, 21 is produced by curing a mixed composition of an urethane prepolymer (A) and a curing agent (B) selected from the group consisting of 1,4-butanediol, hydroquinone bis-βhydroxyl ethyl ether, 3,5-diethyltoluenediamine and 3,5-dimethylthiotoluenediamine. The urethane prepolymer (A) is obtained by reacting p-phenylene-diisocyanate with polytetramethylene glycol (b), and has a terminal isocyanate group.

Preferably, the polyurethane of the outer circumferential layers 2a, 21 is produced by curing the mixed composition in which the urethane prepolymer and the curing agent are mixed such that the equivalent ratio (H/NCO) of an active hydrogen group (H) of the curing agent (B) and an isocyanate group (NCO) of the urethane prepolymer has a value in the range of 0.88<H/NCO≦1.0.

Preferably, the polyurethane has a "JIS A hardness" ranging from 92 to 99 (preferably from 95 to 99).

The isocyanate compound (a) as a material of the urethane prepolymer (A) contains 55 to 100 molar % (preferably 75 molar % or more) of p-phenylene-diisocyanate (PPDI) in the isocyanate compound.

Isocyanate compounds other than PPDI include 2,4-tolylene-diisocyanate (2,4-TDI), 2,6-tolylene-diisocyanate (2,6-TDI), 4,4'-methylene bis(phenyl isocyanate) (MDI) and 1,5-naphthylene-diisocyanate (NDI). These isocyanate compounds can be used in combination with PPDI if 45 molar % or smaller (preferably 25 molar % or smaller) thereof is contained in the isocyanate compound (a).

Polyol may be used as a material of the urethane prepolymer (A). Polyol can be used if it contains 65 to 100 molar % (preferably 85 molar % or greater) of polytetramethylene glycol (PTMG).

Polyol other than PTMG include polyoxypropylene glycol (PPG), polyethylene adipate (PEA), polycaprolactonediol (PCL), trimethylolpropane (TMP) and polycarbonatediol (PCD) which can be used in combination with PTMG, if 35 molar % or smaller (preferably 15 molar % or smaller) thereof is contained in the polyol.

The polycarbonatediol refers to C6-homo-polycarbonatediol, C6/C5 carbonatediol copolymer, and C6/C4 carbonatediol copolymer.

The curing agent which can be used is selected from the group consisting of 1,4-butanediol, hydroquinone bis-βhydroxyl ethyl ether, 3,5-diethyltoluenediamine and 3,5-dimethylthiotoluenediamine.

The curing agent may be used in combination with other curing agents such as 4,4'-methylenedianiline (MDA), 4,4'-methylene-bis-(2-chloroaniline) (MOCA), etc. The proportion of the other curing agents is 15 molar % or smaller.

Figure 1B:
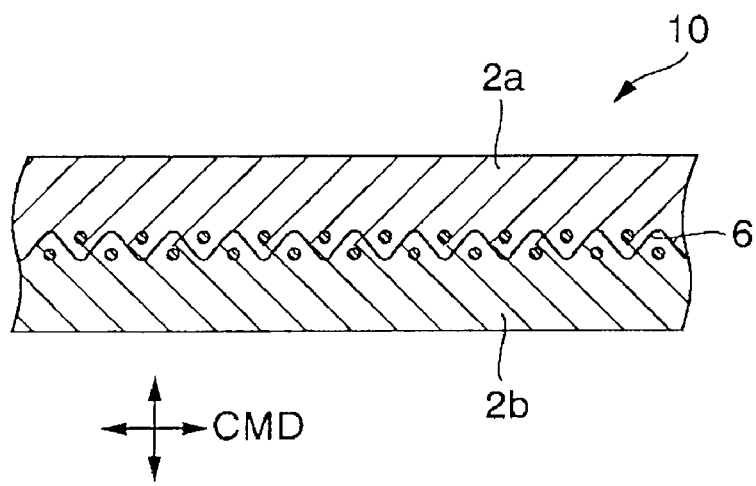

The shoe press belt may be made of the above polyurethane alone as with the shoe press belt shown in FIG. 1(A) or may be of a multilayer structure of polyurethanes having other compositions as with the shoe press belt shown in FIG. 1(B).

The shoe press belt 10 shown in FIG. 1(B) has the reinforcing fiber base 6 and the polyurethane layer which are integral with each other. The reinforcing fiber base 6 is embedded in the polyurethane layer. The outer circumferential layers 2a, 21 and the inner circumferential layers 2b, 22 of the shoe press belt 10 are made of polyurethane.

The outer circumferential polyurethane layers 2a, 21 are made of a polyurethane produced by curing a mixed composition of an urethane prepolymer (A) and a curing agent (B) selected from the group consisting of 1,4-butanediol, hydroquinone bis-βhydroxyl ethyl ether, 3,5-diethyltoluenediamine and 3,5-dimethylthiotoluenediamine. The urethane prepolymer (A) is obtained by reacting p-phenylene-diisocyanate compound with polytetramethylene glycol, and has a terminal isocyanate group.

The polyurethane of the outer circumferential layers 2a, 21 is produced by curing the mixed composition in which the urethane prepolymer and the curing agent are mixed such that the equivalent ratio (H/NCO) of an active hydrogen group (H) of the curing agent (B) and an isocyanate group (NCO) of the urethane prepolymer has a value in the range of 0.88<H/NCO≦1.0. Preferably, the polyurethane has a "JIS A hardness" ranging from 92 to 99.

The inner circumferential polyurethane layers 2b, 22 are made of a polyurethane produced by curing a mixed composition of an urethane prepolymer and curing agent selected from the group consisting of 3,5-dimethylthiotoluenediamine, hydroquinone bis-βhydroxyl ethyl ether, 3,5-diethyltoluenediamine and 1,4-butanediol.

The urethane prepolymer is obtained by reacting an isocyanate compound selected from the group consisting of 2,4-tolylene-diisocyanate (2,4-TDI), 2,6-tolylene-diisocyanate (2,6-TDI) and 4,4'-methylene bis(phenyl isocyanate) with polytetramethylene glycol, and has a terminal isocyanate group. The reinforcing fiber base 6 is embedded in the inner circumferential polyurethane layers 2b, 22.

The polyurethane of the inner circumferential layers 2b, 22 is produced by curing the mixed composition in which the urethane prepolymer and the curing agent are mixed such that the equivalent ratio (H/NCO) of an active hydrogen group (H) of the curing agent and an isocyanate group (NCO) of the urethane prepolymer has a value in the range of 0.93<H/NCO<1.05.

Figure 1C:
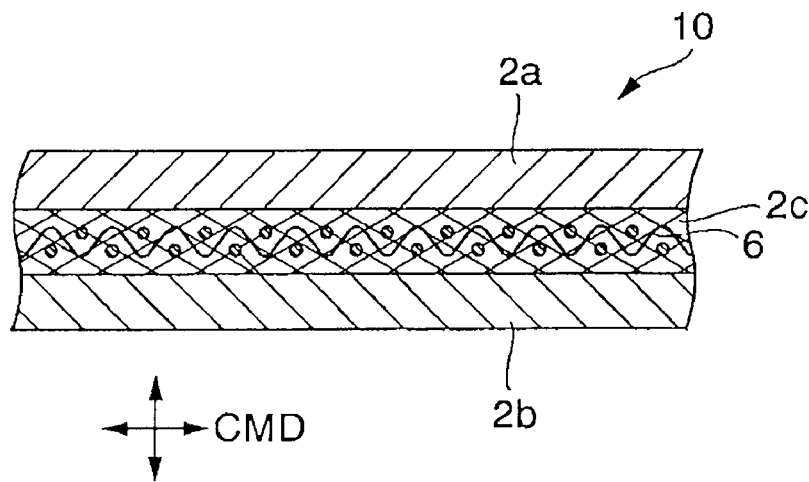

The shoe press belt 10 shown in FIG. 1(C) has the reinforcing fiber base 6 and the polyurethane layer which are integral with each other. The reinforcing fiber base 6 is embedded in the intermediate polyurethane layer 2c. The outer circumferential polyurethane layer 2a and the inner circumferential polyurethane layer 2b are disposed on respective both sides of the intermediate polyurethane layer 2c.

The outer circumferential polyurethane layer 2a and the inner circumferential polyurethane layer 2b are made of a polyurethane produced by curing a mixed composition of an urethane prepolymer (A) and curing agent (B) selected from the group consisting of 1,4-butanediol, hydroquinone bis- βhydroxyl ethyl ether, 3,5-diethyltoluenediamine and 3,5-dimethylthiotoluenediamine. The urethane prepolymer (A) is obtained by reacting p-phenylene-diisocyanate compound with polytetramethylene glycol (b), and has a terminal isocyanate group.

The intermediate polyurethane layer 2c is made of a polyurethane produced by curing a mixed composition of an urethane prepolymer and curing agent selected from the group consisting of 1,4-butanediol, hydroquinone bis-βhydroxyl ethyl ether, 3,5-dimethylthiotoluenediamine and 3,5-diethyltoluenediamine. The urethane prepolymer is obtained by reacting an isocyanate compound selected from the group consisting of 2,4-tolylene-diisocyanate (2,4-TDI), 2,6-tolylene-diisocyanate (2,6-TDI) and 4,4'-methylene bis(phenyl isocyanate) with polytetramethylene glycol and has a terminal isocyanate group.

In the shoe press belt 10 shown in FIG. 1(C), the polyurethane of the outer circumferential polyurethane layer 2a and the inner circumferential polyurethane layer 2b produced by curing the mixed composition in which the urethane prepolymer and the curing agent are mixed such that the equivalent ratio (H/NCO) of an active hydrogen group (H) of the curing agent and an isocyanate group (NCO) of the urethane prepolymer has a value in the range of $0.88 < H/NCO \leq 1.0$. Preferably, the polyurethane has a "JIS A hardness" ranging from 92 to 99.

Preferably, the polyurethane of the intermediate layer 2c produced by curing the mixed composition in which the urethane prepolymer and the curing agent are mixed such that the equivalent ratio (H/NCO) of an active hydrogen group (H) of the curing agent and an isocyanate group (NCO) of the urethane prepolymer has a value in the range of $0.93 < H/NCO < 1.05$.

It is possible for the shoe press belts 10 employing the laminated polyurethane layers as shown in FIGS. 1(B) and 1(C) to incorporate other polyols, isocyanate compounds and curing agents in a range equal to or less than 35 molar % (preferably 15 molar % or less) of the polyol, the isocyanate compound, and the curing agent described above, insofar as those other polyols, isocyanate compounds and curing agents will not impair the object of the present invention.

A method for manufacturing the shoe press belt 10 is described below.

First, for example, a parting agent is applied to the surface of a mandrel. While the mandrel is rotating, a mixture of a urethane prepolymer and a curing agent for producing the inner circumferential polyurethane layer 2b, 22 is then applied to the surface of the mandrel.

In this application, the mixture is applied to deposit the inner circumferential polyurethane layer 2b, 22 having a thickness in the range from 0.8 to 3.5 mm. The applied resin layer of the mixture is then precured by being heated at 70 to 140° C. for 0.5 to 1 hour.

The reinforcing fiber base 6 is placed on the inner circumferential polyurethane layer 2b, 22. Then, a mixture of a urethane prepolymer and a curing agent for producing the intermediate layer 2c is applied to a thickness ranging from 0.5 to 2 mm to impregnate the base 6 and is bonded to the inner circumferential polyurethane layer 2b, 22. The applied resin layer of the mixture is precured at 50 to 120° C. for 0.5 to 1 hour. The intermediate polyurethane layer 2c reinforced with the reinforcing fiber base 6 is now produced.

Thereafter, while the mandrel is rotating, a mixture of a urethane prepolymer and a curing agent for producing the outer circumferential polyurethane layer 2a, 21 is applied to the surface of the intermediate layer 2c.

In this application, the mixture is applied to deposit the outer circumferential polyurethane layer 2a, 21 having a thickness in the range from 1.5 to 4 mm. The applied resin layer of the mixture is then cured by being heated at 70 to 140° C. for 2 to 20 hours.

Thereafter, the concave grooves 24 shown in FIG. 4 are formed in the outer circumferential polyurethane layer 2a, 21. Specifically, while the outer circumferential polyurethane layer 2a, 21 is being cured with heat, a heated embossing roll having ridges complementary to the depth of the concave grooves 24 on its surface may be used.

The embossing roll is pressed against the outer circumferential polyurethane layer 2a, 21 being cured, thereby forming the concave grooves 24 in the outer circumferential polyurethane layer 2a, 21. The mandrel incorporates a heating device therein.

Another method for manufacturing the shoe press belt 10 is described below.

First, for example, a parting agent is applied to the surface of a mandrel. Then, a mixture of a urethane prepolymer and a curing agent for producing the inner circumferential polyurethane layer 2b, 22 is applied to the mandrel to deposit a polyurethane layer having a thickness in the range from 0.8 to 3 mm, and then the mixture is precured by being heated at 70 to 140° C. for 0.5 to 2 hours.

The reinforcing fiber base 6 is then placed on the outer surface of the cured polyurethane layer. Thereafter, a mixture of a urethane prepolymer and a curing agent for producing the intermediate layer 2c is applied in a thickness ranging from 0.5 to 2 mm to impregnate the fiber base 6 and is bonded to the inner circumferential layer 2b, 22. The applied resin layer is precured at 50 to 120° C. for 0.5 to 1 hour, and the intermediate polyurethane layer 2c reinforced with the fiber base 6 is produced accordingly.

Then, a mixture of a urethane prepolymer and a curing agent for producing the outer circumferential layer 2a, 21 is applied to form the outer circumferential polyurethane layer 2a, 21 having a thickness in the range from 2 to 4 mm, and then is post-cured at 70 to 140° C. for 12 to 20 hours.

Then, concave grooves 24 are formed in the surface of the outer circumferential polyurethane layer 2a, 21 with the reinforcing fiber base 6 embedded therein by a cutting tool. Finally, the surface of the outer circumferential polyurethane layer 2a, 21 is polished with sandpaper or a polyurethane polishing cloth.

A method for manufacturing the shoe press belt 10 having the intermediate layer 2c is described below.

First, a parting agent is applied to the surface of a mandrel. Then, a mixture of a urethane prepolymer and a curing agent for producing the inner circumferential layer 2b, 22 is applied to the surface of the mandrel to deposit the inner circumferential layer 2b, 22 having a thickness in the range from 0.8 to 3 mm. The mixture is then precured by being heated at 50 to 140° C. for 0.5 to 2 hours.

Then, the prefabricated intermediate polyurethane layer 2c having a thickness ranging from 1 to 2 mm with the reinforcing fiber base 6 embedded therein is wound around the outer surface of the inner circumferential layer 2b, 22. Then, the intermediate layer 2c is pressed by a nip roll which is heated at 50 to 140° C.

Furthermore, a mixture of the urethane prepolymer and the curing agent for producing the outer circumferential layer 2a, 21 is applied to form the outer circumferential polyurethane layer 2a, 21 having a thickness in the range from 2 to 4 mm, and then is post-cured at 70 to 140° C. for 2 to 20 hours.

Then, the outer circumferential surface of the laminated polyurethane layer with the reinforcing fiber base 6 embedded therein is polished with sandpaper or a polyurethane polishing cloth. Thereafter, concave grooves 24 are formed in the surface of the outer circumferential layer 2a, 21 by a cutting tool.

A method for manufacturing the shoe press belt 10 using two rolls instead of a mandrel is described below.

According to the present method, the reinforcing fiber base 6, which is endless, is stretched between the two rolls. Then a mixed composition of an urethane prepolymer and a curing agent is applied to the surface of the reinforcing fiber base 6 to impregnate the reinforcing fiber base 6, and is precured at 50 to 120° C. for 0.5 to 2 hours, accordingly.

Thereafter, a mixture of a urethane prepolymer and a curing agent for producing the inner circumferential polyurethane layer 2b, 22 of the shoe press belt is applied to deposit a polyurethane layer having a thickness in the range from 0.5 to 3 mm. The mixture is cured at 70 to 140° C. for 2 to 12 hours, and its surface is polished with sandpaper or a polishing cloth. In this manner, an integral structure including the inner circumferential polyurethane layer 2b, 22 and the reinforcing fiber base 6 which are bonded to each other is produced.

Then, the integral structure is reversed and stretched on and between the two rolls. The surface of the stretched integral structure is coated with the mixed composition of an urethane prepolymer and a curing agent to impregnate the reinforcing fiber base 6 with the composition.

The surface is further coated with a mixture of a urethane prepolymer and a curing agent in a thickness ranging from 1.5 to 4 mm, and the mixture is cured at 70 to 140° C. for 2 to 20 hours. After the curing is finished, the surface layer is polished to a given thickness, and concave grooves 24 are formed therein by a cutting tool to produce the outer circumferential layer 2a, 21.

EXAMPLES

The production of polyurethane test pieces for evaluating the physical properties of polyurethane of the shoe press belt 10 is described below.

Reference Example 1

A urethane prepolymer is produced by reacting p-phenylene-diisocyanate (PPDI) with polytetramethylene glycol (PTMG). A composition (H/NCO is 0.95) consisting of the urethane prepolymer (NCO% is 5.51%, the viscosity at 55° C. is 1,800 cps, and the preheating temperature is 66° C.) obtained above and 1,4-butanediol is poured into a preheated mold assembly, and is heated to 127° C. to precure the composition at 127° C. for 0.5 hour.

Thereafter, the precured composition is removed from the die assembly, and then is post-cured at 127° C. for 16 hours, thereby producing a cured polyurethane sheet having a "JIS A hardness" of 98.1. A test piece (having a thickness of 1.5 mm) was fabricated from the polyurethane sheet.

Reference Example 2

A urethane prepolymer is produced by reacting p-phenylene-diisocyanate (PPDI) with polytetramethylene glycol (PTMG). A composition (H/NCO is 0.95) consisting of the urethane prepolymer (NCO% is 5.51%, the viscosity at 55° C. is 1,800 cps, and the preheating temperature is 120° C.) obtained above and hydroquinone bis-βhydroxyl ethyl ether is poured into a preheated mold assembly, and is heated to 127° C. to precure the composition at 127° C. for 0.5 hour. Thereafter, the precured composition is post-cured at 127° C. for 16 hours.

In this manner, a cured polyurethane sheet having a "JIS A hardness" of 98.1 is produced. A test piece was fabricated from the polyurethane sheet.

Reference Example 3

A urethane prepolymer is produced by reacting p-phenylene-diisocyanate (PPDI) with polytetramethylene glycol (PTMG). A composition (H/NCO is 0.95) consisting of the urethane prepolymer (NCO% is 5.51%, and the preheating temperature is 66° C.) obtained above and 3,5-dimethylthio-toluenediamine (ETHACURE300) is poured into a preheated mold assembly, and is heated to 127° C. to precure the composition at 127° C. for 0.5 hour.

Thereafter, the precured composition is post-cured at 127° C. for 16 hours. In this manner, a cured polyurethane sheet having a "JIS A hardness" of 96.2 is produced. A test piece was fabricated from the polyurethane sheet.

Reference Examples 4 Through 6

FIG. 8 is a table showing experimental data. From the urethane prepolymer and the curing agents shown in FIG. 8, test pieces were produced of polyurethane sheets in the same manner as with Reference examples 1 through 3 under the molding conditions shown in FIG. 8.

The compounded amount of each of the curing agents shown in FIG. 8 refers to parts by weight of the curing agent with respect to 100 parts by weight of the urethane prepolymer.

The obtained test pieces were tested for "JIS A hardness", tensile strength (JIS K6251: Dumbbell No. 3, tension rate of 500 mm/minute), tear resistance (JIS K6252, tear rate of 500 mm/minute, notched angle) and compressive strain (JIS K6262). The physical properties of the test pieces were evaluated by a wear test and the De Mattia flexing test. The obtained physical properties are shown in FIG. 8.

Stress vs. strain curves of various polyurethanes (Reference examples 1, 2, 3 and 5) are shown in FIG. 2. The vertical and horizontal axes of FIG. 2 represent stresses and strains, respectively. FIG. 3 is a diagram showing a correlation between stresses (vertical axis) and strains (horizontal axis) with respect to tear resistance.

In the wear test, the apparatus disclosed JP, A, 2006-144139 was used. Each of the test pieces was attached to a lower portion of a press board, and a rotating roll having a friction member on its outer circumferential surface was rotated while being pressed against a lower surface (a surface to be measured) of the test piece.

The rotating roll applied a pressure of 9.6 kg/cm and was rotated at a rotational speed of 100 m/minute for 20 minutes. After the rotation, a reduction in the thickness of the belt sample (i.e., a depth of wear) was measured.

In the flexural test, a tester, shown in FIG. 6, similar to the De Mattia flexing test machine defined by JIS-K-6260 (2005) was used. Using the tester, the test pieces were tested for crack development at a temperature of 20° C. and a relative humidity of 52% under the following conditions:

A test piece 61 had a size represented by a width of 25 mm and a length of 185 mm (including a gripping allowance (20 mm on each side)), and a pair of grippers 62 were spaced apart from each other by a distance of 150 mm and had a thickness of 3.4 mm. The test piece 61 had a semicircular dimple 61a defined centrally therein which had a radius of 1.5 mm.

One of the grippers 62 was reciprocally moved as indicated by the arrow F. In this reciprocating movement, the distance of the grippers 62 from each other was set at a maximum distance of 100 mm and a minimum distance of 35 mm, and the distance of reciprocating movement was set at 65 mm, and the reciprocating rate was set at 360 reciprocating strokes/minute.

A notch was defined centrally in the test piece 61 and had a length of about 2 mm in the transverse direction of the test piece 61. The test piece 61 was inclined at an angle of 45° to the direction in which the grippers 62 are relatively reciprocally moved as indicated by the arrow F.

Under the above conditions, the test piece 61 was repeatedly flexed and measured for the length of a crack each time a certain stroke count was reached. The "stroke count" refers to a value produced by multiplying the test time by the reciprocating rate. FIG. 9 is a table showing experimental data and shows crack lengths for respective stroke counts in the respective examples.

The test was finished at the time the crack length, starting from the initial measured notch length value (about 2 mm) exceeded 15 mm. Approximate curves were plotted based on the stroke counts and the crack lengths, and the stroke counts at the crack length of 15 mm were read from the approximate curves. Values produced by dividing the grown crack lengths (the crack length of 15 mm–(minus) the initial measured notch length value) by the corresponding stroke counts were used as De Mattia flexing test results.

It can be seen from FIGS. 8 and 9 that, though the flexural resistance of the urethane resin used for the shoe press belt according to Inventive example 1 is represented by a hardness of about 98 higher than the hardness of about 95 of the commercially available shoe press belts, it is of a performance level which is about 10 times higher than the shoe press belts according to the related art and the shoe press belt resin (Comparative example 1) disclosed in Patent documents. The urethane resin used for the shoe press belt according to Inventive example 1 is also of a performance level which is about twice or more higher than the shoe press belts according to the related art and the shoe press belt resin (Comparative example 2) disclosed in Patent documents.

The wear resistance of the resin according to the present invention is also 30% or more higher than the shoe press belts according to the related art and the resins disclosed in Patent documents.

Shoe press belts 10 manufactured by the polyurethane compounds according to Reference examples 1 through 4 and Reference example 6 are described below.

Inventive Example 1

Step 1: A mandrel has a diameter of 1,500 mm and can be rotated about its own axis by a suitable drive means. The mandrel has a surface coated with a parting agent (KS-61: manufactured by Shin-Etsu Chemical Co., Ltd.).

Then, the urethane prepolymer (PPDI/PTMG prepolymer), and the curing agent (manufactured by Mitsubishi Chemical Co., Ltd.) of 1,4-butanediol according to Reference example 1 are mixed into a composition such that the equivalent ratio (H/NCO) is 0.95.

Then, the mandrel is rotated. The mandrel which is being rotated is spirally coated with the mixed composition in a thickness of 1.4 mm by a pouring formation nozzle which is movable parallel to the rotational axis of the mandrel (this coating process is hereinafter referred to as "spiral coating"). In this manner, a urethane resin layer is produced.

The urethane resin layer is left to stand at the room temperature for 10 minutes while the mandrel is being rotated. The urethane resin is precured by being heated at 127° C. for 0.5 hour by a heater combined with the mandrel. In this manner, a shoe-side inner circumferential urethane layer 2b, 22 is produced.

Step 2: Multifilament twisted yarns of 5,000 dtex made of polyethylene terephthalate fiber are used as weft yarns and multifilament yarns of 550 dtex made of polyethylene terephthalate fiber are used as warp yarns. A grid-like web, wherein the warp yarns are sandwiched by the weft yarns and the crossings of the warp yarns and the weft yarns are joined by a urethane adhesive, is prepared. The warp yarn density is one yarn/cm and the weft yarn density is four yarns/cm on the grid-like web.

A plurality of the grid-like webs are placed as one layer, without gaps therebetween, on the outer circumferential surface of the shoe-side layer such that the weft yarns extend along the axial direction of the mandrel.

Then, multifilament yarns of 6,700 dtex of polyethylene terephthalate fiber are helically wound around the outer circumferential surfaces of the grid-like webs at a pitch of 30 yarns/5 cm, producing a wound-yarn layer.

Thereafter, the polyurethane composition is applied as an intermediate layer in a thickness of about 1.6 mm sufficiently to close the gap between the grid-like webs and the wound-yarn layer. Thus, an intermediate polyurethane layer 2c reinforced with a fiber base 6 is produced.

Step 3: The same polyurethane composition as the resin used to make the shoe-side layer is applied to the wound-yarn layer in a thickness of about 2.5 mm by spiral coating, thereby impregnating the wound-yarn layer. Then, the polyurethane composition is post-cured by being heated at 127° C. for 16 hours, producing a wet paper web-side layer (an outer circumferential layer 2a, 21).

Then, the surface of the wet paper web-side layer is polished until the overall thickness becomes 5.2 mm. Thereafter, a number of concave grooves (a concave groove width of 0.8 mm, a depth of 0.8 mm and a pitch of 2.54 mm) 24 are formed along the MD (Machine Direction) of the belt 10 (stated otherwise, the direction in which the belt 10 runs (flows)), using a rotating blade. In this manner, a shoe press belt 10 is produced. The CMD (Cross Machine Direction) of the belt 10 is a width direction of the belt 10.

Inventive Example 2

In Inventive example 1, the polyurethane composition according to Reference example 2 (the composition of the PPDI/PTMG prepolymer and HQEE) is used instead of the polyurethane composition according to Reference example 1. Other procedural details, which are the same as those of Inventive example 1, are employed to produce a shoe press belt 10.

Inventive Example 3

In Inventive example 1, the polyurethane composition according to Reference example 3 (the composition of the PPDI/PTMG prepolymer and ETHACURE300) is used instead of the polyurethane composition according to Reference example 1. Other procedural details, which are the same as those of Inventive example 1, are employed to produce a shoe press belt 10.

Comparative Example 1

In Inventive example 1, the polyurethane composition (the composition of the TDI/PTMG prepolymer and ETHA- CURE300) according to Reference example 4 is used instead of the polyurethane composition according to Reference example 1. Except that the composition is precured at 100° C. for 0.5 hour and is post-cured at 100° C. for 16 hours, the same procedural details as those of Inventive example 1 are employed to produce a shoe press belt.

Comparative Example 2

In Comparative example 1, the polyurethane composition (the composition of the MDI/PTMG prepolymer and ETHA-CURE300) according to Reference example 6 is used instead of the polyurethane composition according to Reference example 4. The same procedural details as those of Comparative example 1 are employed to produce a shoe press belt.

A wear test and a flexural test were conducted on the shoe press belts 10 thus produced. In the wear test on the belt samples, grooved product belt samples were evaluated. Since the grooves product belt samples tend to have a greater depth of wear than planar resin test samples, they were tested under following test conditions:

In the wear test, the apparatus disclosed in JP, A, 2006-144139 was used. Each of the belt samples was attached to a lower portion of a press board. A rotating roll having a friction member on its outer circumferential surface was rotated while being pressed against a lower surface (a surface to be measured) of the belt sample.

The rotating roll was applied at a pressure of 6.6 kg/cm, and was rotated at a rotational speed of 100 m/minute for 45 seconds. After the belt sample was rotated, a reduction in the thickness of the belt sample (i.e., a depth of wear) was measured. The wear test on the belt samples was conducted to evaluate the samples before they are grooved.

The depth of wear was 0.213 mm for Inventive example 1, 0.471 mm for Inventive example 2, 0.501 mm for Inventive example 3, 0.269 mm for Comparative example 1, and 0.615 mm for Comparative example 2. The depth of wear represents the average value of the depths of wear measured in five repeated cycles.

Figure 7:
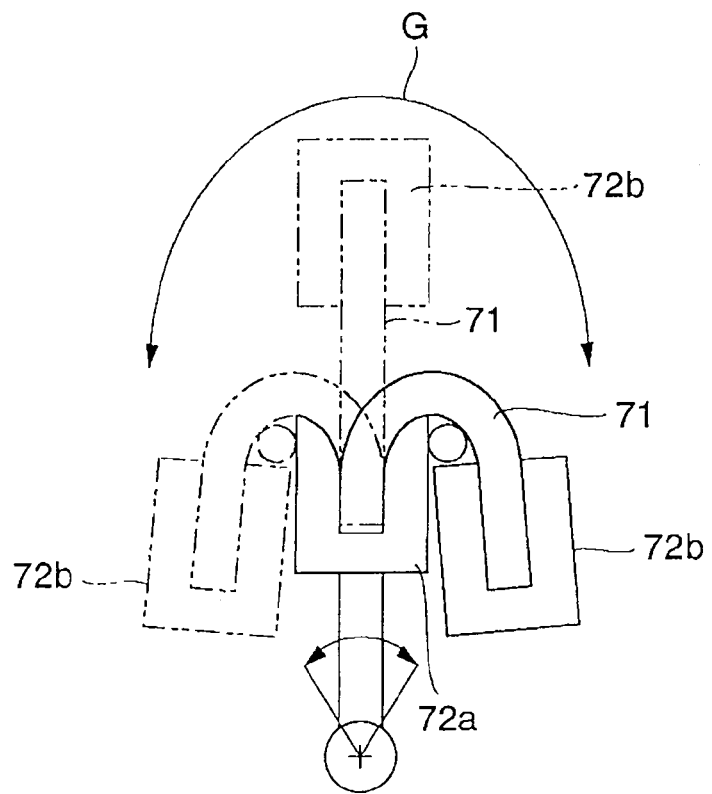
FIG. 7 a view illustrative of a flexural fatigue test.

FIG. 7 is a view illustrative of a flexural fatigue test. In the flexural fatigue test, an apparatus shown in FIG. 7 was used to produce cracks at a temperature of 20° C. and a relative humidity of 52% under the following conditions:

A test piece 71 had a width of 60 mm, and a pair of grippers 72a, 72b was spaced apart from each other by a distance of 70 mm. The lower gripper 72a was reciprocally moved along an arcuate path as indicated by the arrow G. Accordingly, the upper gripper 72b and the test piece 71 were also reciprocally moved, causing the distal end of the lower gripper 72a to flex and fatigue the test piece 71.

The distance from the center of the arcuate path to the distal end of the lower gripper 72a was 168 mm. The distance that the lower gripper 72a moved was 161 mm, and the reciprocating rate of the lower gripper 72a was 162 reciprocating strokes/minute. The upper gripper 72b had a weight of 400 g. The test piece 71 was repeatedly flexed under the above conditions, and the number of times that the test piece 71 was flexed until it cracked was measured.

FIG. 10 is a table showing experimental data representative of depths of wear and the numbers of times that the test pieces were flexed.

As shown in FIG. 10, the test pieces 71 according to Inventive examples 1 through 3 did not crack when they were flexed 700,000 times. The test piece 71 according to Comparative example 1 was disabled when it was flexed 200,000 times, and the test piece 71 according to Comparative example 2 was disabled when it was flexed 500,000 times.

As described above, the shoe press belts 10 according to Inventive example 1, Inventive example 2 and Inventive example 3 have an excellent wear resistance capability, a flexural resistance capability which is three times or more the shoe press belts according to the related art and the shoe press belts according to Patent documents (Comparative example 1), and about 1.3 times or more commercially available shoe press belts and the shoe press belts according to Patent documents (Comparative example 2). Therefore, it will be seen that the shoe press belt 10 according to the present invention has a greatly increased durability.

Inventive Example 4

Step 1: A mandrel has a diameter of 1,500 mm and can be rotated about its own axis by a suitable drive means. The mandrel has a surface coated with a parting agent (KS-61: manufactured by Shin-Etsu Chemical Co., Ltd.).

Then, the urethane prepolymer (PPDI/PTMG/1,4-butanediol), and the curing agent (manufactured by Mitsubishi Chemical Co., Ltd.) of 1,4-butanediol according to Reference example 1 are mixed into a composition such that the equivalent ratio (H/NCO) is 0.95.

Then the mandrel is rotated. The mandrel, which is being rotated, is coated with the composition in a thickness of 0.8 mm by using a doctor bar. The composition is left to stand at the room temperature for 10 minutes while the mandrel is being rotated. The resin is precured by being heated at 127° C. for 0.5 hour by a heater combined with the mandrel. In this manner, an inner circumferential polyurethane layer 2b, 22 are produced.

Step 2: the surface of the precured inner circumferential polyurethane layer 2b, 22 is coated with the polyurethane composition (PPDI/PTMG/HQEE) according to Reference example 2 in a thickness of 1.4 mm, using a doctor bar.

The composition is left to stand at the room temperature for 10 minutes while the mandrel is being rotated. The resin is precured by being heated at 127° C. for 0.5 hour by the heater combined with the mandrel. In this manner, a shoe-side inner circumferential polyurethane layer 2b, 22 is produced.

Step 3: Multifilament twisted yarns of 5,000 dtex made of polyethylene terephthalate fiber are used as weft yarns and multifilament yarns of 550 dtex made of polyethylene terephthalate fiber are used as warp yarns. A grid-like web, wherein the warp yarns are sandwiched by the weft yarns and the crossings of the warp yarns and the weft yarns are joined by a urethane adhesive, is prepared. The warp yarn density is one yarn/cm, and the weft yarn density is four yarns/cm on the grid-like web.

A plurality of the grid-like webs are placed as one layer, without gaps therebetween, on the outer circumferential surface of the shoe-side layer such that the weft yarns extend along the axial direction of the mandrel.

Then, multifilament yarns of 6,700 dtex of polyethylene terephthalate fiber are helically wound around the outer circumferential surfaces of the grid-like webs at a pitch of 30 yarns/5 cm, producing a wound-yarn layer.

Thereafter, the polyurethane composition according to Reference example 4 is applied in a thickness of about 1.6 mm sufficiently to close the gap between the grid-like webs and the wound-yarn layer, thereby integrally joining the grid-like webs and the wound-yarn layer. In this manner, an intermediate layer 2c reinforced with a fiber base is produced.

Step 4: The polyurethane composition (TDI/PTMG/ETHACURE300) according to Reference example 4 for the shoe-side layer is applied to the wound-yarn layer in a thickness of 1.4 mm to impregnate and coat the wound-yarn layer.

The applied layer of the composition is cured by being heated at 100° C. for 0.5 hour. In this manner, an intermediate polyurethane layer 2c is produced.

Step 5: the polyurethane composition (PPDI/PTMG/HQEE) according to Reference example 2 is applied to the outer circumferential surface of the intermediate layer 2c in a thickness of about 2.0 mm, and then is cured by being heated at 127° C. for 15 hours. Thus, an outer circumferential polyurethane layer 2a, 21 is produced.

Then, the surface of the wet paper web-side outer circumferential polyurethane layer 2a is polished until the overall thickness becomes 5.5 mm. Thereafter, a number of concave grooves (a groove width of 0.8 mm, a depth of 0.8 mm and a pitch of 2.54 mm) 24 are formed along the MD of the belt 10 using a rotating blade. In this manner, a shoe press belt 10 is produced.

Inventive Example 5

Step 1: A mandrel has a diameter of 1,500 mm and can be rotated about its own axis by a suitable drive means. The mandrel has a surface coated with a parting agent (KS-61: manufactured by Shin-Etsu Chemical Co., Ltd.).

Then, the polyurethane composition (TDI/PTMG/ETHACURE300) according to Reference example 4 is applied to the surface of the mandrel by the spiral coating in a thickness of 1.4 mm while the mandrel is being rotated.

The polyurethane composition is left to stand at the room temperature for 10 minutes while the mandrel is being rotated. The resin is precured by being heated at 100° C. for 0.5 hour by a heater combined with the mandrel.

Step 2: Monofilament yarns of 800 dtex made of polyethylene terephthalate fiber are served as warp yarns and multifilament yarns of 4,500 dtex made of polyethylene terephthalate fiber are served as weft yarns. A woven web (a weft mesh of 30 weft yarns/5 cm and a warp mesh of 40 warp yarns/5 cm) in a single-weft-layer structure is prepared.

A plurality of the woven webs are placed as one layer, without gaps therebetween, on the outer circumferential surface of the shoe-side layer such that the weft yarns extend along the axial direction of the mandrel.

Then, multifilament yarns of 7,000 dtex of polyethylene terephthalate fiber are helically wound around the outer circumferential surfaces of the woven webs at a pitch of 30 yarns/5 cm, producing a wound-yarn layer.

Thereafter, the polyurethane composition (the composition of the TDI/PTMG prepolymer and ETHACURE300) according to Reference example 4 is applied using a doctor bar in a thickness of 1.6 mm sufficiently to close the gap between the woven webs and the wound-yarn layer, thereby integrally joining the woven webs and the wound-yarn layer. In this manner, an intermediate layer 2c reinforced with a fiber base is produced.

Step 3: The polyurethane composition (PPDI/PTMG/1,4-butanediol) according to Reference example 1 is applied to the wound-yarn layer in a thickness of about 2.5 mm by spiral coating. Then, the polyurethane composition is post-cured by being heated at 127° C. for 16 hours.

Then, the surface of the wet paper web-side layer is polished until the overall thickness becomes 5.2 mm. Thereafter, a number of concave grooves (a groove width of 0.8 mm, a depth of 0.8 mm and a pitch of 2.54 mm) 24 are formed along the MD of the belt 10, using a rotating blade. In this manner, a shoe press belt 10 is produced.

Inventive Example 6

Step 1: A mandrel has a diameter of 1,500 mm and can be rotated about its own axis by a suitable drive means. The mandrel has a polished surface coated with a parting agent (KS-61: manufactured by Shin-Etsu Chemical Co., Ltd.).

While the mandrel is rotating, the surface of the mandrel is coated with the polyurethane composition (MDI/PTMG/ETHACURE300) according to Reference example 6 in a thickness of 0.9 mm by spiral coating.

The polyurethane composition coated layer is then left to stand at the room temperature for 10 minutes while the mandrel is being rotated. The polyurethane composition coated layer is precured by being heated at 100° C. for 0.5 hour by a heater combined with the mandrel.

Step 2: Multifilament twisted yarns of 5,000 dtex made of polyethylene terephthalate fiber are used as weft yarns and multifilament yarns of 550 dtex made of polyethylene terephthalate fiber are used as warp yarns. A grid-like, web wherein the warp yarns are sandwiched by the weft yarns and the crossings of the warp yarns and the weft yarns are joined by a urethane adhesive, is prepared. The warp yarn density is one yarn/cm., and the weft yarn density is four yarns/cm on the grid-like web.

A plurality of the grid-like webs are placed as one layer, without gaps therebetween, on the outer circumferential surface of the shoe-side layer such that the weft yarns extend along the axial direction of the mandrel.

Then, multifilament yarns of 6,700 dtex of polyethylene terephthalate fiber are helically wound around the outer circumferential surfaces of the grid-like webs at a pitch of 30 yarns/5 cm, producing a wound-yarn layer.

Thereafter, the polyurethane composition (MDI/PTMG/ETHACURE300) is applied in a thickness of about 1.6 mm sufficiently to close the gap between the grid-like webs and the wound-yarn layer, using a doctor bar, thereby integrally joining the grid-like webs and the wound-yarn layer. In this manner, an intermediate polyurethane layer 2c reinforced with a fiber base is produced.

Step 3: The polyurethane composition (PPDI/PTMG/1,4-butanediol) according to Reference example 1 is applied to the wound-yarn layer in a thickness of about 3 mm by spiral coating. Then, the polyurethane composition is post-cured by being heated at 127° C. for 16 hours.

Then, the surface of the wet paper web-side layer is polished until the overall thickness becomes 5.2 mm. Thereafter, a number of concave grooves (a groove width of 0.8 mm, a depth of 0.8 mm and a pitch of 2.54 mm) 24 are formed along the MD of the belt 10 using a rotating blade. In this manner, a shoe press belt 10 is produced.

The shoe press belt 10 according to the present invention, which is constructed as described above, has excellent mechanical properties in crack resistance, flexural fatigue resistance and wear resistance compared with existing products. Accordingly, the shoe press belt 10 can withstand usage as 1.5 times or more as shoe press belts of the related art.

While the embodiments of the present invention have been described above, the present invention is not limited to the above embodiments, but various modifications and additions may be made within the scope of the present invention.

Identical reference characters denote identical or corresponding parts throughout views.

INDUSTRIAL APPLICABILITY

The shoe press belt for papermaking according to the present invention is applicable to a closed-type shoe press for papermaking.

The invention claimed is:

1. A shoe press belt for papermaking, comprising:
a reinforcing fiber and a polyurethane which are integral with each other, said reinforcing fiber being embedded in said polyurethane, wherein
said polyurethane includes a polyurethane produced by curing a mixed composition of an urethane prepolymer and a curing agent;
said urethane prepolymer is obtained by reacting an isocyanate compound comprising 55 to 100 molar % of a p-phenylene-diisocyanate with polytetramethylene glycol, and has a terminal isocyanate group; and
said curing agent is selected from the group consisting of 1,4-butanediol, hydroquinone bis-βhydroxyl ethyl ether, 3,5-diethyltoluenediamine and 3,5-dimethylthiotoluenediamine.

2. A shoe press belt for papermaking, comprising:
a reinforcing fiber and a polyurethane which are integral with each other, said reinforcing fiber being embedded in said polyurethane, and an outer circumferential layer and an inner circumferential layer of said belt being made of a polyurethane, wherein
said polyurethane of said outer circumferential layer is produced by curing a mixed composition of
an urethane prepolymer, obtained by reacting p-phenylene-diisocyanate with polytetramethylene glycol and having a terminal isocyanate group, and
a curing agent selected from the group consisting of 1,4-butanediol, hydroquinone bis-βhydroxyl ethyl ether, 3,5-diethyltoluenediamine and dimethylthiotoluenediamine;
said polyurethane of said inner circumferential layer is produced by curing a mixed composition of
an urethane prepolymer, obtained by reacting an isocyanate compound selected from the group consisting of 2,4-tolylene diisocyanate, 2,6-tolylene diisocyanate and 4,4'-methylene bis(phenyl isocyanate) with polytetramethylene glycol (b), and having a terminal isocyanate group, and
a curing agent selected from the group consisting of dimethylthiotoluenediamine, hydroquinone bis-βhydroxyl ethyl ether, 3,5-diethyltoluenediamine and 1,4-butanediol; and
said reinforcing fiber is embedded in said inner circumferential layer.

3. The shoe press according to claim 2, wherein:
the dimethylthiotoluenediamine, in the group from which the curing agent for said outer circumferential layer is selected, is 3,5-dimethylthiotoluenediamine; and
the dimethylthiotoluenediamine, in the group from which the curing agent for said inner circumferential layer is selected, is 3,5-dimethylthiotoluenediamine.

4. A shoe press belt for papermaking, comprising:
a reinforcing fiber and a polyurethane which are integral with each other, said reinforcing fiber being embedded in an intermediate layer of said polyurethane, and an outer circumferential polyurethane layer and an inner circumferential polyurethane layer being disposed on respective both sides of said intermediate layer, wherein
said outer circumferential polyurethane layer and said inner circumferential polyurethane layer are made of a polyurethane produced by curing a mixed composition of
an urethane prepolymer, obtained by reacting p-phenylene-diisocyanate with polytetramethylene glycol and having a terminal isocyanate group, and
a curing agent selected from the group consisting of 1,4-butanediol, hydroquinone bis-βhydroxyl ethyl ether, 3,5-diethyltoluenediamine and 3,5-dimethylthiotoluenediamine; and
said intermediate layer is made of a polyurethane produced by curing a mixed composition of
an urethane prepolymer obtained by reacting an isocyanate compound, selected from the group consisting of 2,4-tolylene diisocyanate, 2,6-tolylene diisocyanate and 4,4'-methylene bis(phenyl isocyanate), with polytetramethylene glycol and having a terminal isocyanate group, and
a curing agent selected from the group consisting of 1,4-butanediol, hydroquinone bis-βhydroxyl ethyl ether, dimethylthiotoluenediamine and 3,5-diethyltoluenediamine.

5. The shoe press according to claim 4, wherein:
the dimethylthiotoluenediamine, in the group from which the curing agent for said intermediate layer is selected, is 3,5-dimethylthiotoluenediamine.

* * * * *

UNITED STATES PATENT AND TRADEMARK OFFICE
CERTIFICATE OF CORRECTION

| | |
|---|---|
| PATENT NO. | : 7,943,013 B2 |
| APPLICATION NO. | : 12/666301 |
| DATED | : May 17, 2011 |
| INVENTOR(S) | : Takao Yazaki et al. |

It is certified that error appears in the above-identified patent and that said Letters Patent is hereby corrected as shown below:

On the title page, Item (30), the Foreign Application Priority Data is incorrect. Item (30) should read:

-- (30)     Foreign Application Priority Data

Jun. 25, 2007     (JP) ............................ 2007-166373 --

Signed and Sealed this
Twenty-eighth Day of June, 2011

David J. Kappos
*Director of the United States Patent and Trademark Office*